(12) United States Patent
Diethelm et al.

(10) Patent No.: US 9,263,914 B2
(45) Date of Patent: Feb. 16, 2016

(54) POWER SUPPLY UNIT FOR SIGNAL LUMINAIRES

(75) Inventors: Bernhard Diethelm, Galgenen (CH); Rolf Schmid, Stäfa (CH)

(73) Assignee: SIEMENS SCHWEIZ AG, Zurich (CH)

( * ) Notice: Subject to any disclaimer, the term of this patent is extended or adjusted under 35 U.S.C. 154(b) by 159 days.

(21) Appl. No.: 13/704,340

(22) PCT Filed: May 21, 2011

(86) PCT No.: PCT/EP2011/058312
§ 371 (c)(1),
(2), (4) Date: Jan. 25, 2013

(87) PCT Pub. No.: WO2011/157512
PCT Pub. Date: Dec. 22, 2011

(65) Prior Publication Data
US 2013/0113377 A1    May 9, 2013

(30) Foreign Application Priority Data
Jun. 16, 2010  (EP) .................................. 10166155

(51) Int. Cl.
*H02J 1/10* (2006.01)
*H02J 9/06* (2006.01)
(Continued)

(52) U.S. Cl.
CPC ................. *H02J 9/06* (2013.01); *B61L 5/1881* (2013.01); *H02J 9/065* (2013.01); *H05B 33/0815* (2013.01); *B61L 2207/02* (2013.01); *Y02B 20/346* (2013.01); *Y02B 20/347* (2013.01)

(58) Field of Classification Search
CPC ........... H05B 33/0803; H05B 33/0815; H05B 33/0842; H05B 33/0806; H05B 33/0854; G08G 1/095; G08G 1/087; G08G 1/0965; G08G 1/096716; H02M 2001/007; H02M 3/1584; H02M 2001/0074; H02M 1/32; H02M 2001/008
USPC ......... 315/159, 160, 291, 307, 213, 220, 277, 315/320, 324, 209 R, 211, 212, 219, 225, 315/226, 312, 276, 86; 340/907, 909, 912, 340/916; 363/12, 80, 65, 67, 71
See application file for complete search history.

(56) References Cited

U.S. PATENT DOCUMENTS 3,614,461 A   10/1971  Speer et al.
3,684,891 A    8/1972  Sieron
(Continued)

FOREIGN PATENT DOCUMENTS

CN   102227859 A   10/2011
WO   91/15048 A2   10/1991

OTHER PUBLICATIONS

IEC 61508 / Functional safety of electrical/electronic/programmable electronic safety-related systems.
(Continued)

*Primary Examiner* — Alexander H Taningco
*Assistant Examiner* — Christopher Lo
(74) *Attorney, Agent, or Firm* — Laurence Greenberg; Werner Stemer; Ralph Locher

(57) ABSTRACT

For signal luminaires which indicate the term STOP or DANGER upon activation, a circuit containing a first operating case feed unit and a second auxiliary source is provided for the purpose of supplying a reliable power supply. In this case, the second auxiliary source is inductively coupled to the signal luminaire electric circuit; while the signal luminaires are capacitively coupled to ground. The use of switches during operation in a fall-back level is obviated in this way.

5 Claims, 4 Drawing Sheets

(51) Int. Cl.
*B61L 5/18* (2006.01)
*H05B 33/08* (2006.01)

(56) References Cited

U.S. PATENT DOCUMENTS

| | | | |
|---|---|---|---|
| 4,030,013 A | 6/1977 | Watrous | |
| 4,564,767 A | 1/1986 | Charych | |
| 6,115,276 A * | 9/2000 | Mao | H02J 9/062 363/127 |
| 8,248,271 B2 * | 8/2012 | Ghanem | G08G 1/095 315/159 |
| 2002/0027510 A1 * | 3/2002 | Jones | G08G 1/095 340/907 |
| 2004/0150371 A1 | 8/2004 | Mount et al. | |
| 2005/0231385 A1 * | 10/2005 | Haase | G06Q 30/0265 340/905 |
| 2008/0298978 A1 * | 12/2008 | Schulman | F04D 15/0218 417/41 |
| 2009/0184582 A1 * | 7/2009 | Hwang | H02J 1/102 307/64 |
| 2010/0039794 A1 | 2/2010 | Ghanem et al. | |
| 2010/0327765 A1 * | 12/2010 | Melanson | H02M 3/3374 315/291 |

OTHER PUBLICATIONS

IEC 61511 / Functional safety—Safety instrumented systems for the process industry sector.

* cited by examiner

US 9,263,914 B2

POWER SUPPLY UNIT FOR SIGNAL LUMINAIRES

BACKGROUND OF THE INVENTION

Field of the Invention

The present invention relates to an power supply unit for signal luminaires in accordance with the preamble of claim 1.

In railway signaling technology it is of particular importance for the signal luminaires to always have a defined display state. This is of special significance for signals in which the dark state has the meaning NO DANGER. This applies for example to unattended railway crossings. Only when a train is approaching the railway crossing is the warning light activated, generally with acoustic support.

The following solutions for activation of signal luminaires are currently known:

i) FIG. 1 shows the signal, based on two LED modules $LED_1$, $LED_n$, each of which has its own line path with individual power monitoring $10_1$, $10_2$. A failure of the principal source $Q_{prinz}$ cannot be detected by the power monitoring, since both deliver the same result.

ii) FIG. 2 shows a signal which is likewise based on two LED modules $LED_1$, $LED_n$. In addition however a second so-called redundant power supply 25 is provided, which can be connected with a (changeover) switch $S_0$ if required in place of the principal source 20. It should be noted that the ground $Ground_{aux}$ of the auxiliary source is electrically different from the ground $Ground_{prinz}$ of the principal source. The technical reason for the difference between the grounds is as follows:

Circulating currents and parasitic disturbance effects are prevented in this way.

Since the grounds $Ground_{aux}$ and $Ground_{prinz}$ are electrically different, the switchover is not only undertaken with the switch $S_0$, but additionally with a switchover of the ground, here with the switches $S_1$, $S_n$. The indexing 1 . . . n indicates that more than two luminaires can be supplied redundantly in this way.

Even solution ii) does not cover all possible faults:

A failure of the driver card 22 leads to the optical warning provided by these luminaires $LED_1$ and $LED_n$ not being given. At this juncture it is pointed out once again that, in the arrangement and application, the emission of light signals a danger. In the signals for a locomotive driver a different safe rule usually applies: Inactive or <<dark>> signals always mean <<STOP>>, <<DANGER>>.

Publication U.S. Pat. No. 4,564,767 [4] discloses an uninterruptible power supply with a transformer having two primary windings. One primary winding is fed by an AC power source in normal operation. The other primary winding is fed with power from a DC source via an inverter. A logic unit connects the DC source almost instantaneously if the power supply falls below a level of the AC source.

Publication U.S. Pat. No. 3,684,891 [3] discloses a failsafe power supply unit for emergency lighting by means of fluorescent lamps.

The solutions contained in the aforementioned publications are not applicable in the railway field. E.g. in accordance with the teaching of U.S. Pat. No. 3,684,891 [6], it is not possible for a luminaire to be activated independently of the power supply situation.

BRIEF SUMMARY OF THE INVENTION

The underlying object of the present invention is thus to specify an power supply unit for signal luminaires which, even if faults occur, guarantees the safe supply of signal luminaires to signal a danger.

This object is achieved by the measures specified in the independent claim. Advantageous embodiments of the invention are specified in the further claims.

By providing a capacitive coupling via capacitors, mechanical contacts are no longer needed in the signal luminaire circuit. This increases the reliability and availability in the event of a fault. The capacitive coupling can be built into an existing power supply unit in a simple manner.

Thus the following advantages can be additionally provided:

i) By providing an AC source as an auxiliary source the power evaluation can be undertaken independently of the luminaire circuit in the primary circuit. This means that no intervention in the luminaire circuit is required, which additionally increases the reliability of the inventive power supply unit.

ii) Since in operation in the fall-back level all signal luminaires will be supplied with power by definition, a failure of an individual but not all signal luminaires does not yet lead to no danger incorrectly being signaled.

The invention will be explained below in greater detail on the basis of the drawing for example, in which:

DESCRIPTION OF THE INVENTION

Figure 1:
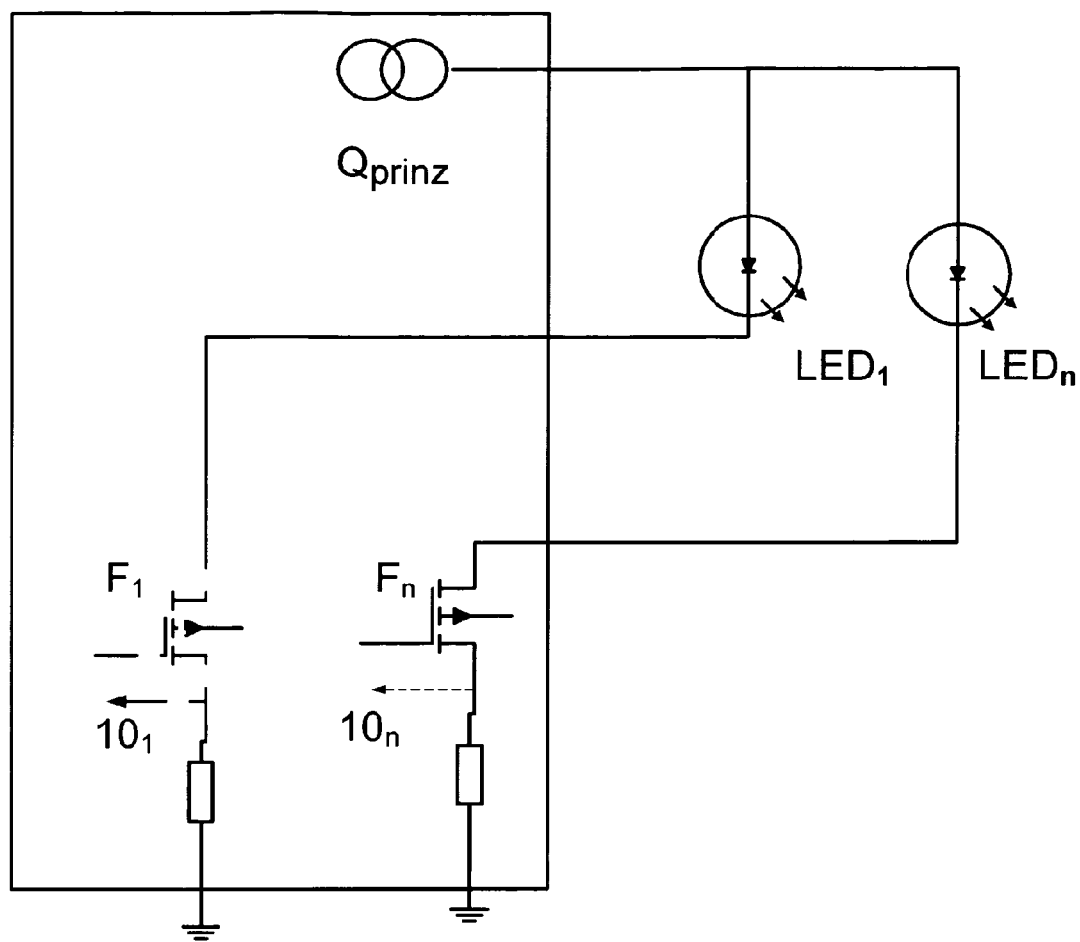
FIG. 1 shows a known solution for the activation of luminaires.
Figure 2:
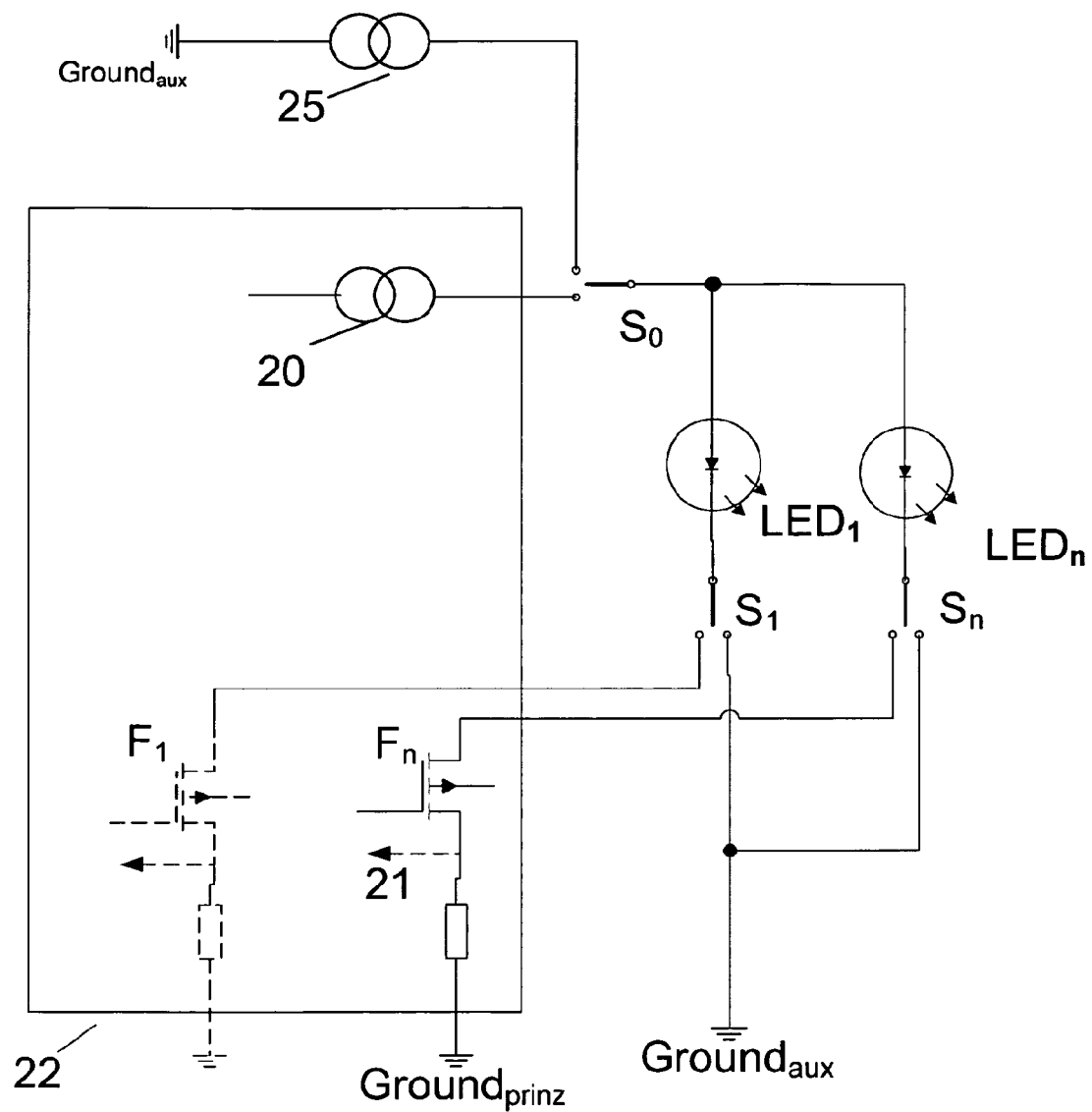
FIG. 2 shows a known solution for the activation of luminaires with a principle source and an auxiliary source.
Figure 3:
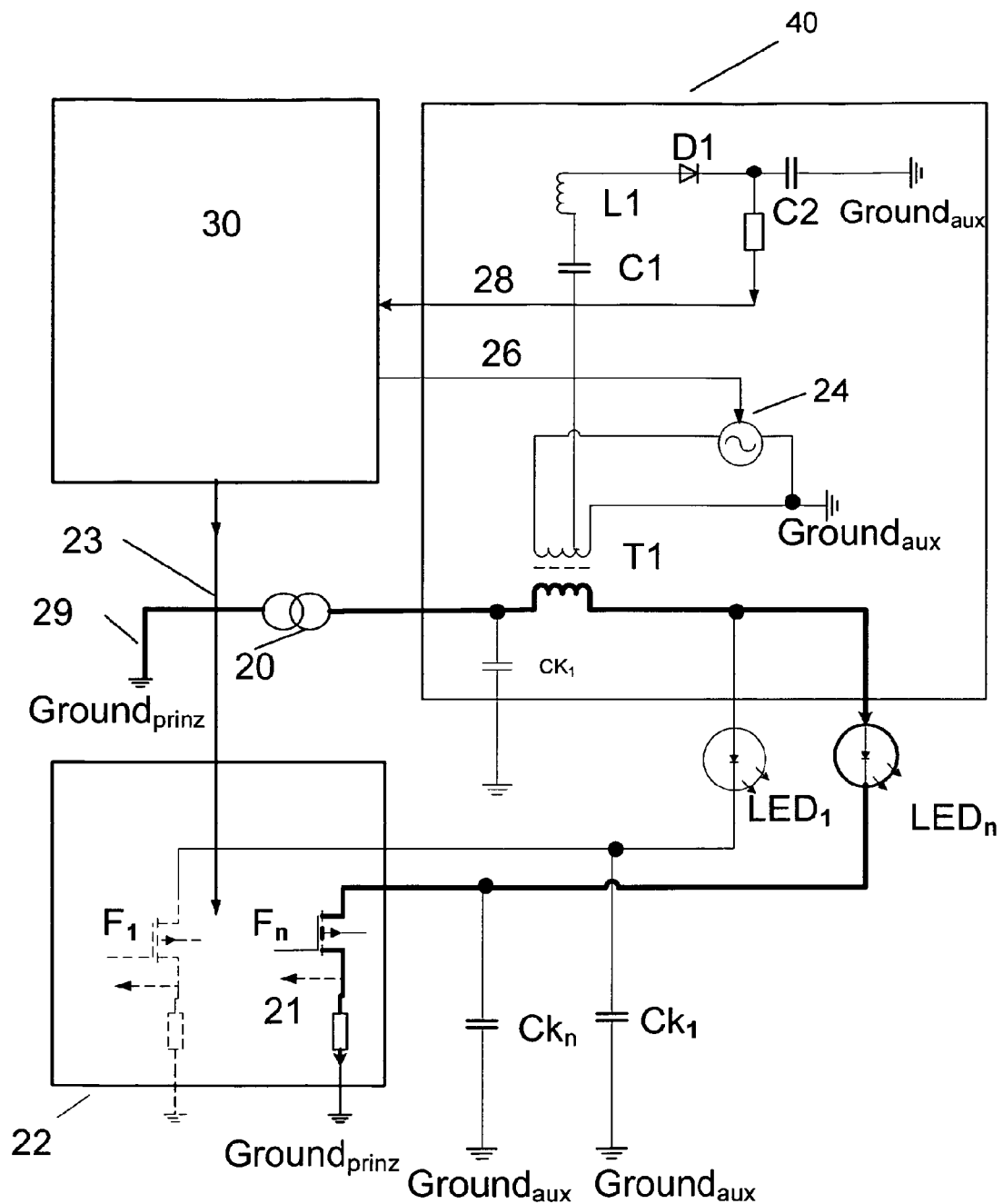
FIG. 3 shows a block diagram in accordance with an exemplary embodiment of the present invention, which depicts normal operation.

FIG. 3 shows an exemplary embodiment of the present invention for normal operation: A safe computer 30 with a defined switch-off behavior according to SIL 0-4 activates the driver card 22 for normal operation. This activation occurs via a control line 23. Instead of a computer 30 a programmable logic controller SPS 30 can also be provided. Whether it is computer 30 or programmable logic controller SPS 30: Both have to meet requirement SIL 0-4 within the meaning of the IEC 61508 [1] and IEC61511 [2] families of standards. A principal source 20 feeds a signal luminaire embodied as an LED via the signal circuit 29, shown in bold in FIG. 3. The two specified grounds $Ground_{prinz}$ are identical in electrical terms. In accordance with FIG. 3 it is for example $LED_n$ which is activated. n in this case stands for index n from a predetermined number 1 . . . N of LEDs to be supplied from the source 20. The other parts are also indexed accordingly:

Switches F1, . . . Fn.

The actual status of $LED_n$ is evaluated with power evaluation unit 21.

Figure 4:
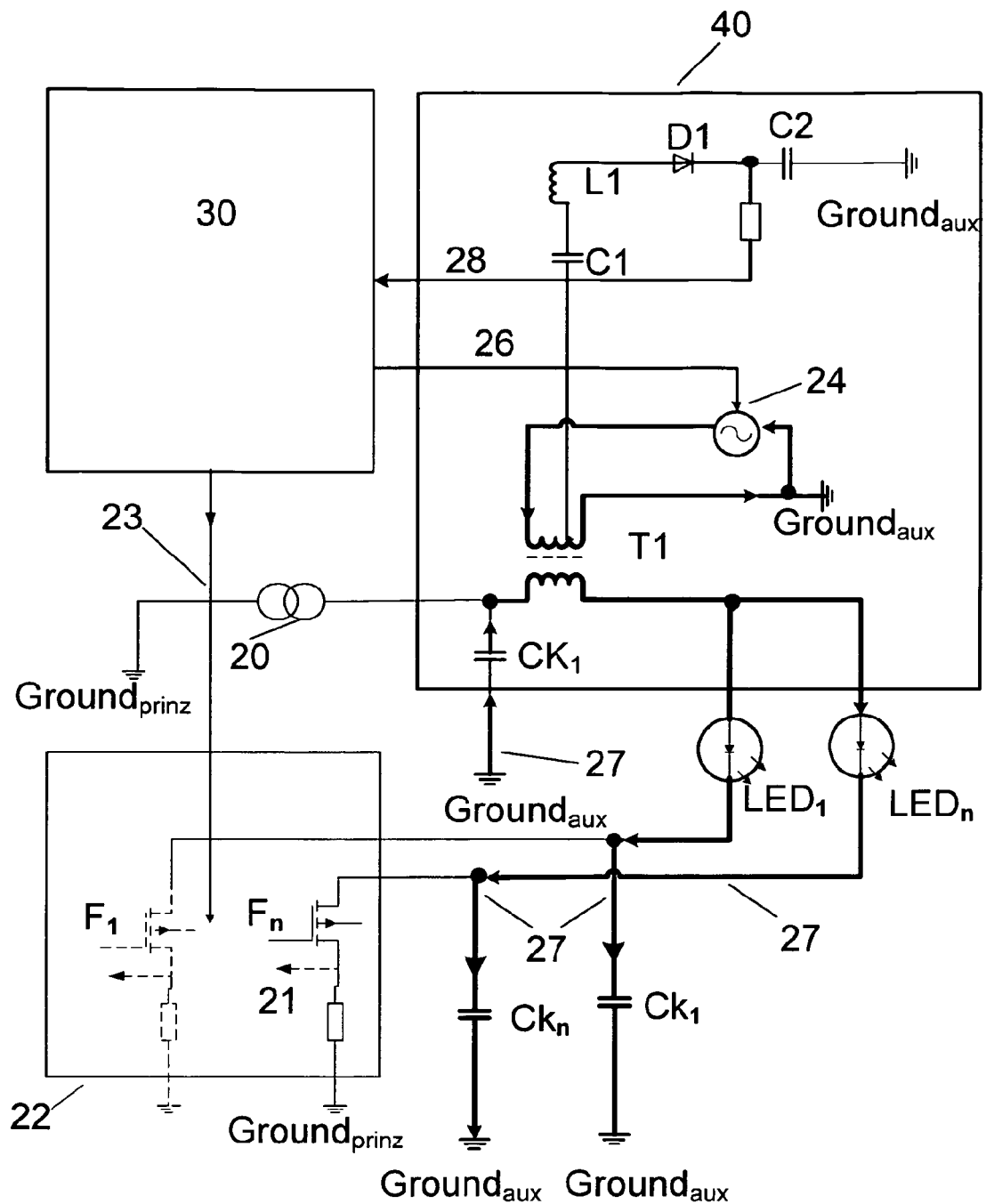
FIG. 4 shows a block diagram in accordance with an exemplary embodiment of the present invention, which depicts operation in the fall-back level.

FIG. 4 shows the exemplary embodiment of the present invention in accordance with FIG. 3 for operation in the fall-back level: For some reason the principle source 20 (also called the operating case feed unit 20) or the driver card 22 are no longer in a position to supply an $LED_n$ with power or to activate it. The SPS 30 or the computer 30 activate an auxiliary source 24 via a control line 26 for activating the fall-back level. The auxiliary source 24 outputs an AC voltage. A current flows over a (primary) coil of a transformer T1. The secondary coil of this transformer T1 now supplies all signal luminaires $LED_1 \ldots LED_n$ with power via the ground $Ground_{aux}$ over the signal circuit 27. This signal circuit 27 in the fall-back level is shown in bold in FIG. 4. A tap on the primary winding T1 allows an evaluation 28 of amplitude and frequency by the capacitor C1 and the inductance L1. This ensures the safe notification of a current flow in the circuit of the auxiliary source 24 and the primary coil of the transformer T1 while assuming a defined load of signal luminaires $LED_1 \ldots LED_n$. In this way a fault of $LED_1 \ldots LED_n$ can be determined. Should a fault of all LEDs except for a single $LED_x$ occur, this fault does not yet lead to no danger being incorrectly signaled. The auxiliary source 24, the transformer T1 and the current evaluation unit 28 form the so-called fall-back level feed 40.

A frequency ranging between 1 kHz and 20 kHz is provided for the auxiliary source 24. In operation in the fall-back level, i.e. on activation of the auxiliary source 24, the current in the secondary circuit flows via capacitors CK on the primary winding side and $CK_1$, $Ck_n$ on the luminaire side $LED_1 \ldots LED_n$ to ground $Ground_{aux}$. The four grounds $Ground_{aux}$ specified in FIG. 4 are electrically identical. These capacitors CK, $CK_1$, $Ck_n$ are dimensioned so that, in this mode of operation (fall-back level), they exhibit a low series impedance.

The exemplary embodiment explained above has related to signal luminaires embodied as LEDs. The invention is also equally applicable for the following signal luminaires (not a definitive list):

Incandescent lamps,
Flash lamps,
Flashing lights.

The signal luminaires involved must merely have the characteristic of being able to be supplied with alternating current (AC).

LIST OF REFERENCE CHARACTERS, GLOSSARY $10_1$, $10_2$ Power monitoring
20 Operating case feed unit unit; Main source; DC source, AC source; first power source
21 Power evaluation
22 Driver card
23 Activation of operating case feed unit; control line for activation of operating case feed unit
24 Auxiliary source, AC source, second power source
25 Auxiliary source, redundant source, battery
26 Activation of fall-back level, control line for activation of fall-back level
27 Signal circuit in the fall-back level
28 Frequency/amplitude checking
29 Signal circuit in the operational level
30 SPS, secure computer with defined switch-off behavior SIL 0-4;
40 Fall-back level supply
Ck Coupling capacitor at a secondary winding tower of transformer T1
$Ck_1$, $Ck_n$ (Coupling) capacitors assigned to signal luminaires $LED_1$, $LED_n$
$F_1$, $F_n$ Switch, relay contact; MOS-FET
$Ground_{aux}$ Auxiliary source ground
$Ground_{prinz}$ Principal source ground
$LED_1$, $LED_2$ Signal luminaires,
$Q_{aux}$ Auxiliary source, second source, DC-, AC source
$Q_{prinz}$ Principle source, DC-, AC source
$S_0$, $S_1$, Sn Changeover switches SIL Safety Integrity level in accordance with IEC 61511-x and IEC 61508-x family of standards
SPS Programmable Logic Controller
T1 Transformer

LIST OF CITED LITERATURE

[1] IEC 61508
<<Functional safety of electrical/electronic/programmable electronic safety-related systems>>
[2] IEC 61511
<<Functional safety—Safety instrumented systems for the process industry sector>>
[3] U.S. Pat. No. 3,684,891
<<Fail-safe solid-state emergency lighting power supply and transfer circuit>>
Assignee: Dual-Lite Company, Newtown, Conn.
[4] U.S. Pat. No. 4,564,767
<<Uninterruptible switching power supply system>>
Assignee: TII Industries, Inc., Copiague, N.Y.

The invention claimed is:

1. A power supply unit for a signal luminaire circuit having signal luminaires, the power supply unit comprising:
first and second grounds electrically separated from one another;
a first power source connected to said first ground and being a primary power source;
a second AC power source being independent of said first power source and connected to said second ground;
switches for connecting said first power source to the signal luminaires when required, an emission of light from the signal luminaires signaling danger;
a transformer having a primary winding connected to said second AC power source and a secondary winding having a first side connected to said first power source and a second side connected to said signal luminaires for supplying said signal luminaires with power;
said second AC power source outputs a AC voltage on failure of said first power source and coupled inductively via said transformer to the signal luminaire circuit having the signal luminaires to be supplied with the power, in order to supply the signal luminaires with power; and
at least one capacitor, for an activation of the signal luminaires by means of said second power source by way of said transformer, the signal luminaire circuit is connected via said capacitor in each case to said second ground of said second power source, said capacitor disposed directly between said signal luminaires circuit and said second ground without other components disposed there-inbetween.

2. The power supply unit according to claim 1, further comprising:
a driver card, said switches for switching on the signal luminaires as required are disposed in said driver card; and
a power evaluation unit for each of the signal luminaires.

3. The power supply unit according to claim 2, further comprising:
a control line;
a further control line; and
a controller selected from a group consisting of a computer and a programmable logic controller device, said controller activating said switches of said driver card via said control line connected between said controller and said switches and alternatively, on failure of said first power source, said second power source is able to be activated by said controller respectively via said further control line.

4. The power supply unit according to claim 1, wherein the signal luminaire circuit with said second AC power source is subject to power monitoring.

5. The power supply unit according to claim 4, further comprising:
- a further capacitor connected to said transformer; and
- an inductance connected to said further capacitor, wherein for the power monitoring of the signal luminaire circuit with said second AC power source a tap is provided on said primary winding of said transformer, so that via said capacitor and said inductance, an evaluation also covers an evaluation of amplitude and frequency of the power supply unit via said second AC power source.

* * * * *